United States Patent [19]

Fujiki et al.

[11] Patent Number: 5,120,810
[45] Date of Patent: Jun. 9, 1992

[54] ADHESIVE COMPOSITION

[75] Inventors: Hironao Fujiki; Mikio Shiono; Toshiaki Takahashi, all of Gunma, Japan

[73] Assignee: Shin-Etsu Chemical Company, Limited, Tokyo, Japan

[21] Appl. No.: 522,013

[22] Filed: May 11, 1990

[30] Foreign Application Priority Data

May 12, 1989 [JP] Japan ................................ 1-119661

[51] Int. Cl.$^5$ ............................................. C08G 77/06
[52] U.S. Cl. ..................................... 528/15; 524/263; 524/265; 524/266; 524/730; 524/731; 528/31; 528/42
[58] Field of Search ............... 524/263, 265, 266, 730, 524/731; 528/15, 31, 42

[56] References Cited

U.S. PATENT DOCUMENTS 4,912,188 3/1990 Colas et al. ........................... 528/15

Primary Examiner—Melvyn I. Marquis
Attorney, Agent, or Firm—Millen, White & Zelano

[57] ABSTRACT

This invention discloses an adhesive organopolysiloxane compositions which cure in the presence of addition reaction catalysts and adhere firmly to various materials when they harden comprising;

(1) 100 parts by weight of an organopolysiloxane containing at least alkenyl groups bonded to silicon atoms in 1 molecule, (2) an organohydrogenpolysiloxane containing at least 3 hydrogen atoms bonded to silicon atoms in 1 molecule, in sufficient quantity to donate 0.5–10 hydrogen atoms bonded to silicon atoms to 1 alkenyl group in said 1st constituent, (3) 0.1–20 parts by weight of an organosilicone compound containing at least 1 hydrogen atom bonded to silicon atoms, at least 1 fluoroalkyl group or fluoroalkylether group bonded to silicon atoms via carbon atoms and at least 1 epoxy group and/or trialkoxysilyl group bonded to silicon atoms via carbon atoms in 1 molecule, and (4) platinum or a platinum compound in suitable quantity to act as a catalyst.

15 Claims, No Drawings

ADHESIVE COMPOSITION

FIELD OF THE INVENTION

This invention concerns adhesive compositions. In particular, it concerns adhesive organopolysiloxane compositions which cure in the presence of addition reaction catalysts, and which adhere firmly to various materials when they harden.

BACKGROUND OF THE INVENTION

Organopolysiloxane compositions which cure by means of an addition reaction of alkenyl groups bonded to silicon atoms and hydrogen atoms bonded to silicon atoms are wellknown in the prior art. These compositions cure in a very short time by the action of heat. Not only is this property useful where operations have to be carried out continuously, but also, the reactions involved are not accompanied by the formation of by-products. In addition, there is little shrinkage in the curing process, and as the cured products have excellent heat resistance and electrical properties, they are widely used in potting and sealing of electrical and electronic components.

The polysiloxane compositions known in the prior art however do not adhere well to the substrate with which they are in contact when they cure. This property is desirable when they are used in mold-making applications, but it is a serious drawback where they are made to function as electrical insulators by means of potting, coating or sealing.

To improve their adhesion to the substrate, the surface of the substrate is often treated with primary coatings called a primer. As this primer contains an organic solvent, however, its use presents safety hazards, and it also increases the cost. Further, in the case of some substrate shapes and materials, it may be impossible to apply a primer.

Many attempts have already been made to make said organopolysiloxane compositions adhere to substrates when they cure without the use of a primer by adding various compounds to them.

Examples of such proposals include the addition of polysiloxanes with hydrogen atoms bonded to silicon atoms and trialkoxysilylalkyl groups (Japanese Patent KOKAI No. 48-16952, herein "Japanese Patent KOKAI" means Publication of Unexamined Japanese Patent), and the addition of polysiloxanes with epoxy groups and/or ester groups bonded to silicon atoms via carbon atoms bonded directly to silicon atoms, and hydrogen atoms bonded to silicon atoms (Japanese Patent KOKAI No. 50-39435), and the addition of polysiloxanes with epoxy group and trialkoxysilyl groups bonded to silicon atoms via carbon atoms bonded directly to silicon atoms, and hydrogen atoms bonded to silicon atoms (Japanese Patent KOKAI No. 53-33256), as a 3rd constituent.

In all of the above cases, however, the added component had insufficient wettability on the substrate, its adhesive functional groups such as epoxy and trialkoxysilyl groups did not function effectively, and it had poor self-adhesion properties on the various substrates used as electrical and electronic components.

The authors of the present invention carried out intensive studies to resolve the disadvantages of the prior art, and especially of these additives. We then found that by adding a silicon compound with fluoroalkyl groups or fluoroalkylether groups as a 3rd constituent to the polysiloxane composition which cures by reaction of hydrosilyl groups and alkenyl groups bonded to silicon atoms, and heating to a relatively low temperature for a short time, it was possible to make the composition adhere satisfactorily to metals and plastics.

SUMMARY OF THE INVENTION

An object of this invention is therefore to provide an organopolysiloxane composition which adheres to metal and plastic substrates by itself when it cures.

The above object was attained by an adhesive composition comprising:

(1) 100 parts by weight of an organopolysiloxane containing at least 2 alkenyl groups bonded to silicon atoms in 1 molecule, (2) an organohydrogenpolysiloxane containing at least 3 hydrogen atoms bonded to silicon atoms in 1 molecule, in sufficient quantity to donate 0.5-10 hydrogen atoms bonded to silicon atoms to 1 alkenyl group in said 1st constituent, (3) 0.1-20 parts by weight of an organosilicon compound containing at least 1 hydrogen atom bonded to silicon atoms, at least 1 fluoroalkyl group or fluoroalkylether group bonded to silicon atoms via carbon atoms and at least 1 epoxy group and/or trialkoxysilyl group bonded to silicon atoms via carbon atoms in 1 molecule, and (4) platinum or a platinum compound in suitable quantity to act as a catalyst.

The composition of this invention may be used for potting of electronic instrument components or impregnation of coils, and in many other applications where adhesive properties are required.

PREFERRED EMBODIMENT OF THE INVENTION

The organopolysiloxane containing at least 2 alkenyl groups bonded to silicon atoms of the 1st constituent of this invention, may have a straight-chain, branched, network or 3-dimensional conformation or a mixture of these conformations, however, a diorganopolysiloxane of the straight-chain is preferable and alkenyl groups of 2-6 carbon atoms are desirable. Examples of alkenyl groups of 2-6 carbon atoms bonded to silicon atoms may be vinyl, allyl, 1-butenyl or 1-hexenyl, but vinyl is the most suitable from the viewpoint of ease of synthesis. Examples of organic groups bonded to silicon atoms except alkenyl groups are univalent substituted or unsubstituted hydrocarbon groups of 1-10 carbon atoms such as alkyl groups of 1-6 carbon atoms, e.g., methyl, ethyl propyl, and butyl; aryl groups of 6-10 carbon atoms such as phenyl and tolyl; cycloalkyl groups such as cyclohexyl and cycloheptyl; and groups wherein the hydrogen atoms bonded to carbon atoms in these hydrocarbon groups are partially replaced by halogen atoms such as 3,3,3-trifluoropropyl group or cyano groups such as 2-cyanoethyl group. Of these possibilities, it is preferable that all the groups bonded to silicon atoms except alkenyl groups are either methyl or methyl and phenyl. It is further preferable that the viscosity of said organopolysiloxane at 25° C. is no less than 50 Centistokes, and more preferable that it lies within the range 100-500,000 Centistokes.

The organohydrogenpolysiloxane of the 2nd constituent of this invention cures the composition of this invention, namely, $\equiv$Si—H groups of the 2nd constituent undergoes an addition reaction with the alkenyl groups of the 1st constituent in the presence of the platinum catalyst described below, and it is an essential ingredient in order to obtain a cured silicone material with sufficient strength for practical use. This organohydrogenpolysiloxane should contain at least 3 hydrogen atoms bonded to silicon atoms in 1 molecule, but there is no restriction on its molecular structure, and straight-chain, cyclic or branched chains or three-dimensional network structure manufactured by conventional methods may be used. In these organohydrogenpolysiloxanes, the organic groups bonded to silicon atoms may be univalent substituted or unsubstituted hydrocarbon groups of 1–10 carbon atoms such as alkyl group of 1–6 carbon atoms, e.g., methyl, ethyl and propyl; an aryl group of 6–10 carbon atoms such as phenyl or tolyl; a cycloalkyl group such as cyclohexyl or cycloheptyl; and groups wherein the hydrogen atoms bonded to carbon atoms in these hydrocarbon groups are partially replaced by halogen atoms or the like e.g., 3,3,3-trifluoropropyl group. Of these possibilities, it is particularly preferable that all the groups bonded to silicon atoms except the hydrogen atoms are either methyl or methyl and phenyl.

The amount of the 2nd constituent used should be such that the quantity of hydrogen atoms bonded to silicon atoms in the second constituent is 0.5–10 equivalents with respect to 1 alkenyl group in the 1st constituent, and preferably 0.75–4 equivalents.

If the amount of the hydrogen atoms in the 2nd constituent is less than 0.5 or more than 10 equivalents with respect to the alkenyl groups in the 1st constituent, the degree of crosslinkage decreases, physical properties after curing deteriorate, bubbles tend to form during curing, and the physical properties of the cured material easily degenerate at high temperature.

The organosilicon compound of the 3rd constituent of this invention is blended with the composition to give it adequate adhesion properties, and it is therefore essential. Said organosilicon compound must contain at least 1 hydrogen atom bonded directly to silicon atoms, at least 1 fluoroalkyl group or fluoroalkylether group bonded to silicon atoms via carbon atoms and at least 1 epoxy group and/or trialkoxysilyl group bonded to silicon atoms via carbon atoms in 1 molecule. From the viewpoint of readiness in synthesis, however, it is preferable that this constituent is an organopolysiloxane derivative, and in particular, an organohydrogenpolysiloxane derivative. The siloxane skeleton of said compound may be cyclic, straight-chain, branched or a mixture of these conformations, but from the viewpoint of readiness in synthesis, it should preferably have a cyclic polysiloxane skeleton or a straight-chain skeleton. In the case of a cyclic skeleton, from the viewpoint of readiness in synthesis, it is desirable that the number of silicon atoms comprising the siloxane ring is 3–6 and preferably 4.

On the otherhand, if the molecular chain is the straight-chain, it comes to difficult to synthesize since a viscosity becomes large when molecular weight is large and it comes also to difficult to treat. Thereofore, numbers of silicon atoms to form siloxane chain are desired to be 3–50, however, the present invention is not limited to that range.

These compounds may be prepared by a partial addition reaction, according to the usual methods, for example, of an organic compound with vinyl and fluoroalkyl or fluoroalkylether groups, or with vinyl and epoxy and/or trialkoxysilyl groups, to an organohydrogenpolysiloxane with at least 3 hydrogen atoms bonded to silicon atoms in 1 molecule. Examples of above mentioned fluoroalkyl or fluoroalkylether groups are groups of 3–15 carbon atoms but groups of 3–10 carbon atoms are preferable. Examples of the groups containing epoxy group are glycydoxy group $$(-CH_2CH-CH_2),$$
$$\diagdown_O\diagup$$

3,4-epoxycyclohexyl group 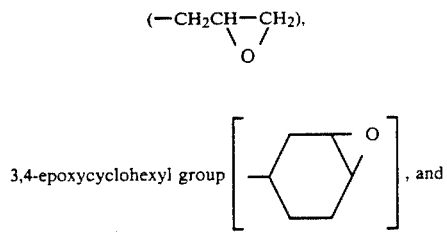, and examples of trialkoxysilyl groups are groups containing alkoxy group of 1–4 carbon atoms such as trimethoxysilyl group, triethoxysilyl group, triisopropoxysilyl group, tributoxysilyl group, tri(methoxyethoxy)silyl group, tri(ethoxyethoxy)silyl group et.

In this invention, the desired product may be isolated after the reaction is complete, but the reaction mixture may also be used after removal of unreacted material and the addition reaction catalyst.

Specific examples of the oraganosilicon compounds used as 3rd constituent may be represented by the following structural formulae:

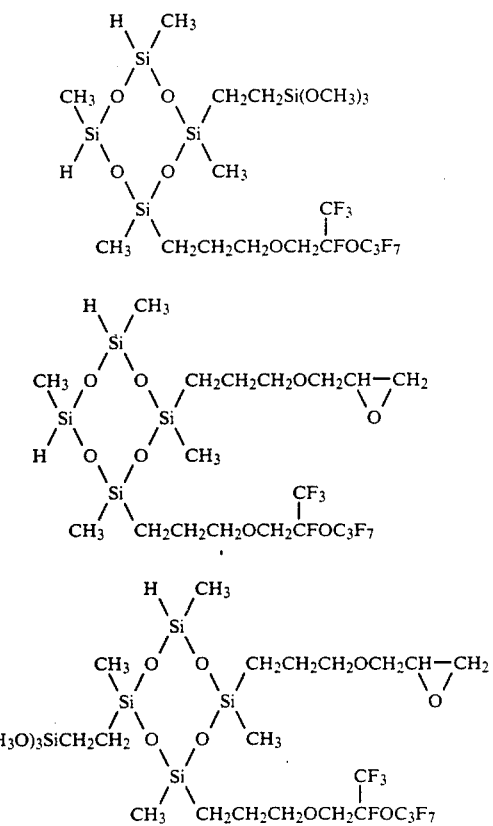

-continued
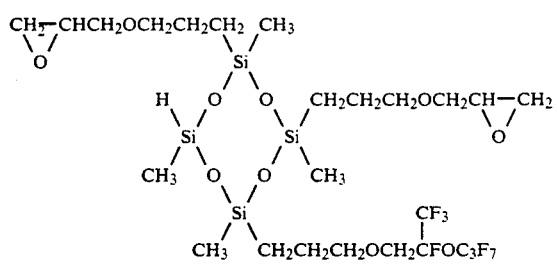
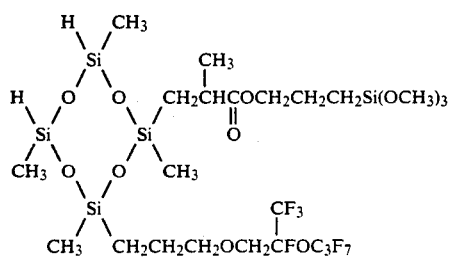
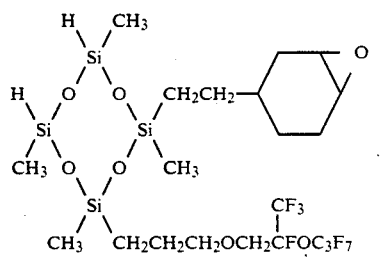
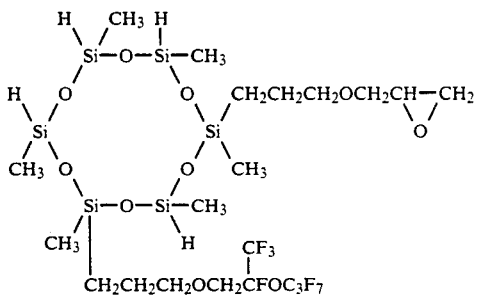
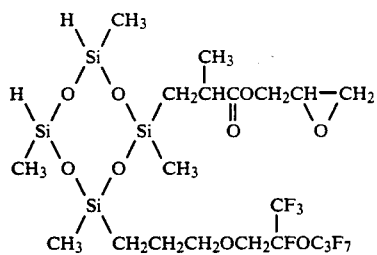
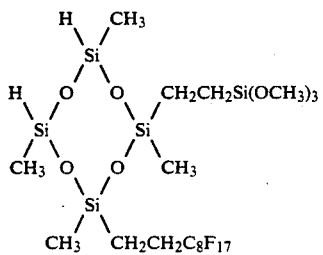
-continued
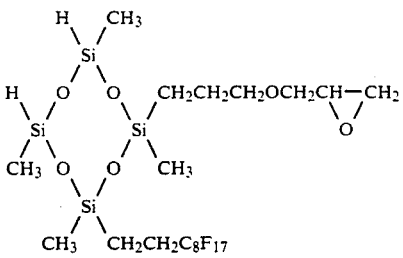
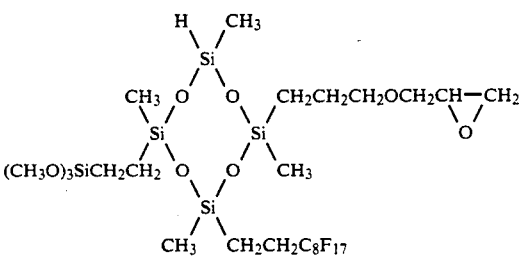
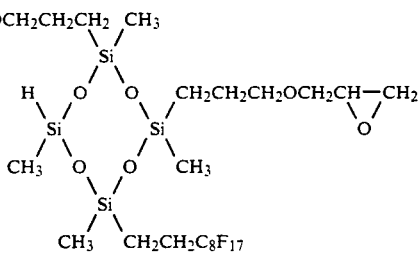
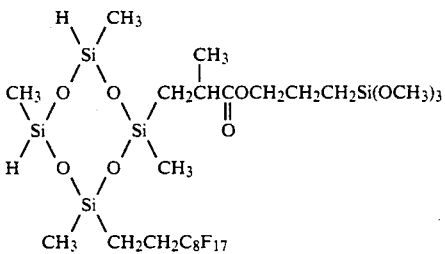
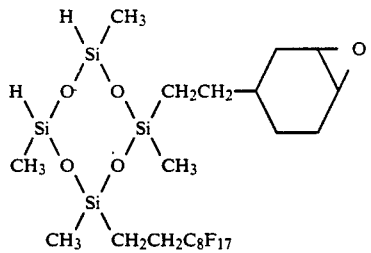
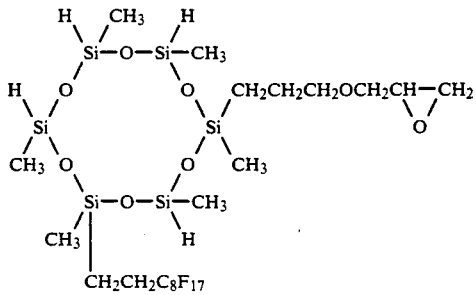

-continued

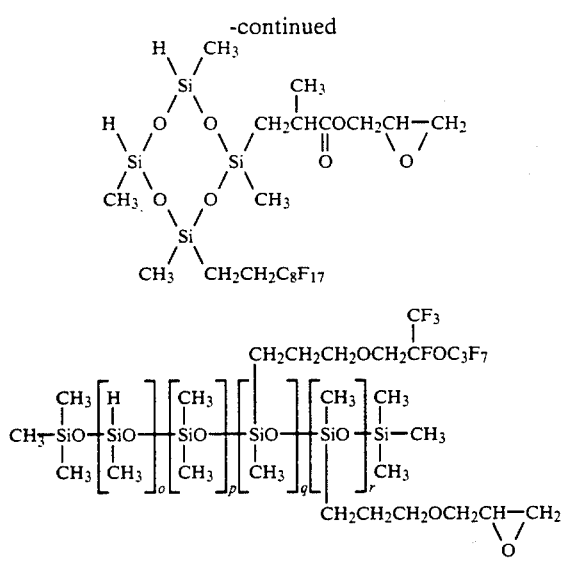

(where o, q and r are positive integers, and p is a 0 or a positive integer. Total Number of the o, p, q and r is 3–300.)

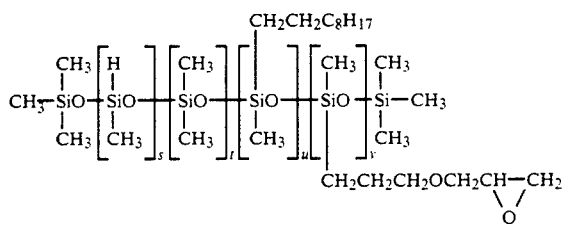

(where s, u and v are positive integers, and t is a 0 or a positive integer. Total Number of the s, t, u and v is 3–300.)

The quantity of 3rd component used is 0.1–20 parts by weight, and preferably 1–10 parts by weight, with respect to 100 parts by weight of the 1st component. If it is less than 0.1 parts by weight, sufficient adhesive force is not obtained; if it is greater than 20 parts by weight, the physical properties of the cured material obtained deteriorate, and often interfere with curing properties.

The platinum or platinum compound of the 4th constituent is a catalyst of which the function is to promote the addition reaction of the alkenyl groups of the 1st constituent, and the hydrosilyl groups of the 2nd constituent. Any of the usual catalysts of this type may be used including platinum black, chloroplatinic acid, complexes of chloroplatinic acid with olefines and aldehydes, or alcohol derivatives of chloroplatinic acid and complexes of chloroplatinic acid with vinylsiloxanes.

The quantity of these constituents is suitably adjusted depending on the rate of curing, but the quantity of platinum atoms is generally 0.1–500 ppm, and preferably 1–200 ppm, with respect to the quantity of the 1st constituent used. If the quantity of platinum is less than 0.1 ppm, the composition often does not cure well and special care has to be taken when using it; if the quantity is greater than 500 ppm, no advantage is gained and the method simply becomes unecnomical.

In this invention, in addition to said four constituent, fillers, pigments, heatproofing agents, flameproofing agents, adhesive adjuncts and reaction controllers may be blended with the composition if necessary, and other types of organopolysiloxanes may also be blended. Examples are reinforcing fillers such as fumed silica, precipitated silica, quartz powder, fused silica powder, diatomaceous earths and calcium carbonate; pigments such as titanium oxide, red iron oxide and carbon black; additives which confer heat resistance and flame retarding properties such as red iron oxide, titanium oxide, carbon black, cerium oxide, cerium hydroxide, zinc carbonate, manganese carbonate and platinum compounds; thermally conducting agents such as alumina, boron nitride and silicon carbide; and viscosity regulators such as dimethylpolysiloxane. The quantity of these additives may be chosen as desired provided that they do not detract from the invention.

The adhesive composition of this invention may be stored as one package, or it may be divided into two packages.

When it is stored as one package, an acetylenic compound or a platinum catalyst of low activity at room temperature, for example, is blended with it. When it is stored as two packages, part of the 1st constituent and the 4th constituent is stored in one package, and the remainder of the 1st constituent is stored in the other package together with the 2nd and 3rd constituents.

After the adhesive organopolysiloxane of this invention is injection molded, impregnated, filled or coated, it is kept in the vicinity of 100° C. or a higher temperature for a short time so that it can cure while it is firmly adhering to the materials with which it is in contact. This adhesive force is considerably stronger than in the case where the 3rd component does not contain fluoroalkyl or fluoroalkylether groups.

EXAMPLES

We shall now describe this invention in more detail with reference to specific examples, but it should be understood that the invention is in no way limited to them. All parts specified in the examples are parts by weight.

EXAMPLE 1

80 parts of a straight-chain dimethyl polysiloxane terminated at both ends with dimethylvinylsilyl groups and having a viscosity of 5,000 cs at 25° C., 20 parts of an organopolysiloxane comprising 50 mole % of $SiO_2$, 42.5 mole % of $(CH_3)_3 SiO_{0.5}$ and 7.5 mole % of $(CH_2=CH)(CH_3)_2SiO_{0.5}$, 2.5 parts of a straight-chain methylhydrogen polysiloxane terminated at both ends with trimethylsilyl groups and having a viscosity of 3 cs at 25° C., 50 parts of quartz powder of particle diameter 15 μm, 0.1 parts of a 2% solution of chloroplatinic acid in 2-ethylhexanol as platinum catalyst, 0.3 parts of a 50% solution of ethynylcyclohexanol in toluene, and 6 parts of the oragnosilicon compound (A) shown below, were mixed uniformly together.

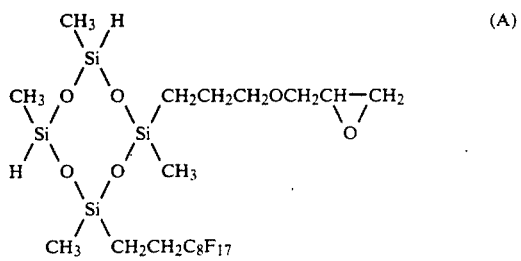

This mixture was applied to various test substrates to a thickness of 1.5 mm, and hardened at 120° C. for 1 hour.

The adhesion to the substrates was found to be as follows:

TABLE 1

| Substrate | Adhesion |
|---|---|
| Glass | ○ |
| Aluminium | ○ |
| Nickel | ○ |
| Chrome | ○ |
| Stainless steel | ○ |
| Epoxy resin | ○ |
| Unsaturated polyester resin | ○ |
| Polybutylene terephthalate resin | Δ |
| Polycarbonate resin | × |

The adhesion was judged by the following criteria:
○: adheres strongly so as to cohesive failure
Δ: adhesion is rather weak
×: no adhesion at all.

For comparison purposes, adhesion tests were carried out on a composition identical to the above excepting that compound (A) was omitted. It was found that the composition did not adhere to any of the substrates at all.

EXAMPLE 2

80 parts of a straight-chain dimethyl polysiloxane terminated at both ends with trivinylsilyl groups and having a viscosity of 100,000 cs at 25° C., 20 parts of an organopolysiloxane comprising 50 mole % of $SiO_2$, 43 mole % of $(CH_3)_3SiO_{0.5}$ and 7 mole % of $(CH_2=CH)(CH_3)_2SiO_{0.5}$, 2.5 parts of a straight-chain methylhydrogen polysiloxane terminated at both ends with trimethylsilyl groups and having a viscosity of 3 cs at 25° C., 50 parts of quartz powder of particle diameter 15 μm, 0.1 parts of a 2% solution of chloroplatinic acid in 2-ethylhexanol as platinum catalyst, 0.3 parts of a 50% solution of ethynylcyclohexanol in toluene, and 7 parts of the organosilicon compound (B) shown below, were mixed uniformly together.

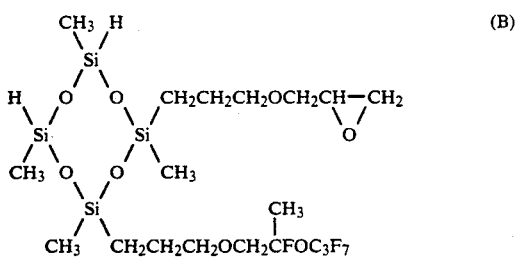

(B)

A layer of this mixture was sandwiched 125 mm×25 mm test panels of various materials to a thickness of approx. 2 mm such that the edges of the panels overlapped by 10 mm, and was hardened by heating at 120° C. for 1 hour.

A shear adhesion test was then performed on these samples to investigate the adhesive strength and the coefficient of cohesive failure. The results are shown in Table 2.

TABLE 2

| Substrate (Type) | Shear Adhesive Strength (kg/cm$^2$) | Cohesive Failure Coefficient (%) |
|---|---|---|
| Glass | — | Substrate breakdown |
| Aluminium | 28 | 100 |
| Nickel | 25 | 100 |
| Chrome | 26 | 100 |
| Stainless steel | 27 | 100 |
| Polyethylene terephthalate resin | 18 | 100 |
| Polybutylene terephthalate resin | 13 | 0 |
| Epoxy resin | 24 | 100 |

The physical properties of the cured materials were examined. It was found that hardness (JISA) was 40, tensile strength (kg/cm) was 42, and elongation (%) was 290, which are excellent values.

For comparison purposes, adhesion tests were carried out on a composition identical to the above excepting that compound (B) was omitted. It was found that the composition did not adhere to any of the substrates at all.

The results of these examples therefore confirm the efficacy of this invention.

What is claimed:

1. An adhesive composition comprising:
   (1) 100 parts by weight of an organopolysiloxane containing at least 2 alkenyl groups bonded to silicon atoms in 1 molecule,
   (2) an organohydrogenpolysiloxane containing at least 3 hydrogen atoms bonded to silicon atoms in 1 molecule, in sufficient quantity to donate 0.5–10 hydrogen atoms bonded to silicon atoms to 1 alkenyl group in (1),
   (3) 0.1–20 parts by weight of an organosilicon compound containing at least 1 hydrogen atom bonded to silicon atoms, at least 1 fluoroalkyl group or fluoroalkylether group bonded to silicon atoms via carbon atoms and at least 1 epoxy group and/or trialkoxysilyl group bonded to silicon atoms via carbon atoms in 1 molecule, and
   (4) platinum or a platinum compound in suitable quantity to act as a catalyst.

2. The adhesive composition of claim 1, wherein the alkenyl groups of the (1) are vinyl groups.

3. The adhesive composition of claim 1, wherein all organic groups bonded to silicon atoms apart from alkenyl groups are either methyl or methyl and phenyl.

4. The adhesive composition of claim 1, wherein a viscosity of the organopolysiloxane of (1) is not less than 50 Centistokes at 25° C.

5. The adhesive composition of claim 4, wherein said viscosity lies within the range 100–500,000 Centistokes.

6. The adhesive composition of claim 1, wherein all organic groups bonded to silicon atoms except alkenyl groups are either methyl or methyl and phenyl.

7. The adhesive composition of claim 1, wherein an amount of the (2) used should be such that the quantity of hydrogen atoms bonded to silicon atoms in the 2nd constituent is 0.75–4 equivalents with respect to 1 alkenyl group in the 1st constituent.

8. The adhesive composition of claim 1, wherein (3) is organopolysiloxane derivative.

9. The adhesive composition of claim 8, wherein said organopolysiloxane delivative is organohydrogenpolysiloxane derivative.

10. The adhesive composition of claim 1, wherein the silicone skelton of the (3) is cyclic conformation.

11. The adhesive composition of claim 10, wherein the number of silicon atoms comprising the siloxane ring is 3-50.

12. The adhesive composition of claim 1, wherein the quantity of (3) used is 1-10 parts by weight with respect to 100 parts by weight of the 1st constituent.

13. The adhesive composition of claim 1, wherein the quantity of (4) lies within the range 0.1-500 ppm as platinum atoms with respect to the quantity of the (1).

14. The adhesive composition of claim 13, wherein said quantity of (4) lies within the range 1-200 ppm.

15. A cured product manufactured by curing the composition of claim 1.

* * * * *